(12) United States Patent
Oliver

(10) Patent No.: US 6,446,928 B1
(45) Date of Patent: Sep. 10, 2002

(54) COMBINATION MOUSE PAD AND COMPUTER DISK HOLDER

(76) Inventor: Paul N Oliver, 13505 W. Poplar Grove Rd., Midlothian, VA (US) 23112

( * ) Notice: Subject to any disclaimer, the term of this patent is extended or adjusted under 35 U.S.C. 154(b) by 503 days.

(21) Appl. No.: 08/855,474

(22) Filed: May 13, 1997

(51) Int. Cl.[7] .............................................. A47B 91/00
(52) U.S. Cl. ................. 248/346.01; 248/544; 248/916; 248/918
(58) Field of Search .......................... 248/346.01, 918, 248/916, 544

(56) References Cited

U.S. PATENT DOCUMENTS

| | | | | |
|---|---|---|---|---|
| 4,002,892 A | * | 1/1977 | Zielinski ...................... 235/156 |
| 4,620,630 A | | 11/1986 | Moss et al. ............... 206/45.24 |
| 4,793,477 A | | 12/1988 | Manning et al. ............ 206/232 |
| 5,022,170 A | * | 6/1991 | House ......................... 40/358 |
| 5,197,301 A | * | 3/1993 | Holcomb .................... 62/457.1 |
| 5,369,964 A | * | 12/1994 | Mauer et al. ................. 62/420 |
| 5,386,964 A | * | 2/1995 | Mayo .......................... 248/346 |
| D361,326 S | | 8/1995 | Schriner et al. ........... D14/114 |
| D364,397 S | | 11/1995 | Bedol et al. ............... D14/114 |
| 5,533,697 A | | 7/1996 | Fletcher et al. ............. 248/146 |
| 5,542,637 A | | 8/1996 | Schriner et al. ....... 248/346.01 |
| 5,600,628 A | | 2/1997 | Spector et al. .............. 369/291 |
| 5,692,815 A | * | 12/1997 | Murphy ...................... 312/283 |
| 5,696,536 A | * | 12/1997 | Murphy ...................... 345/163 |
| 5,791,620 A | * | 8/1998 | Carcich, Jr. ............ 248/346.01 |

* cited by examiner

Primary Examiner—Leslie Braun
Assistant Examiner—Kimberly Wood
(74) Attorney, Agent, or Firm—John H. Thomas, P.C.

(57) ABSTRACT

A combination mouse pad and computer disk holder includes a pad which comprises a body having a top surface and a bottom surface joined by an edge of a selected thickness. The pad further has a pocket therein of dimension sufficient to receive a computer disk. Preferably, the pocket is open to the edge of the pad to allow access to a computer disk that may be stored in the pad.

6 Claims, 2 Drawing Sheets

COMBINATION MOUSE PAD AND COMPUTER DISK HOLDER

FIELD OF THE INVENTION

This invention relates generally to mouse pads and to storage for computer disks.

BACKGROUND OF THE INVENTION

Computers are used by more and more people every day for use at home and at the office. Computers are used not only by more people, but also for new and different applications. One piece of computer equipment that can be found next to most computers is a mouse. Under every mouse is a mouse pad to provide a reliable flat surface on which the mouse can effectively operate.

Mouse pads come in different shapes and sizes. In order to be effective, the mouse pad must have a flat top surface. Typically, the top surface is made of a pliant but stiff material such as vinyl. The mouse pad as a whole must be relatively thin in order to be comfortable for the user of the mouse. The bottom of the mouse pad generally has some kind of nonskid material such as foam rubber to keep the pad from sliding during use.

Mouse pads are also a venue for marketing and advertising, especially by various computer service companies such as software manufacturers or online access providers. These companies often use techniques to give away novelty items such as mouse pads displaying their logos, as well as other items to make sure their name is in front of customers and potential customers. Other types of mouse pads may display, for instance, school, sports teams or television logos.

Computer disks of varying shapes and sizes are also commonly used for storing and transferring information. In addition to being mere depositories of input information, the disks contain a wide range of programs. Common types of computer disks include cd's, 3 ½" disks, zip disks, 5 ¼" diskettes, plus others. These disks may be stored in files or drawers. Unfortunately, they are often misplaced or even lost. Still other times, a disk may not be labeled or may be mislabeled. Still further times, a disk may be separated from its packaging and instructions regarding use may be lost.

SUMMARY OF THE INVENTION

It is an object of the claimed invention to provide a single unit that acts as a computer disk holder and a mouse pad. Further objects, characteristics and advantages of the invention will become apparent from a study of the accompanying drawings and of the description of exemplary preferred embodiments given below and of the accompanying claims.

The invention is directed to a pad for supporting a computer mouse, the pad comprising a body having a top surface and a bottom surface joined by an edge of a selected thickness. The pad further has a pocket therein of dimensions sufficient to receive a computer disk.

In a further aspect, the invention is directed to a combination of a pad having a surface for supporting a computer mouse and a computer disk of a selected diameter wherein the pad includes a pocket for receiving the computer disk therewithin.

In another aspect, the invention is directed to a pad for both supporting a computer mouse and for storing a computer disk. The pad comprises a substantially flat top surface and a bottom surface. There is a side edge about the periphery of the pad between the top and bottom surfaces having a thickness greater than the thickness of a computer disk. The pad further has a pocket through its thickness in substantially the shape of a computer disk wherein the pocket has an opening to a portion of the periphery of the pad. In this way, a computer disk is stored in the pocket within the pad.

DETAILED DESCRIPTION OF PREFERRED EMBODIMENTS

Figure 1:
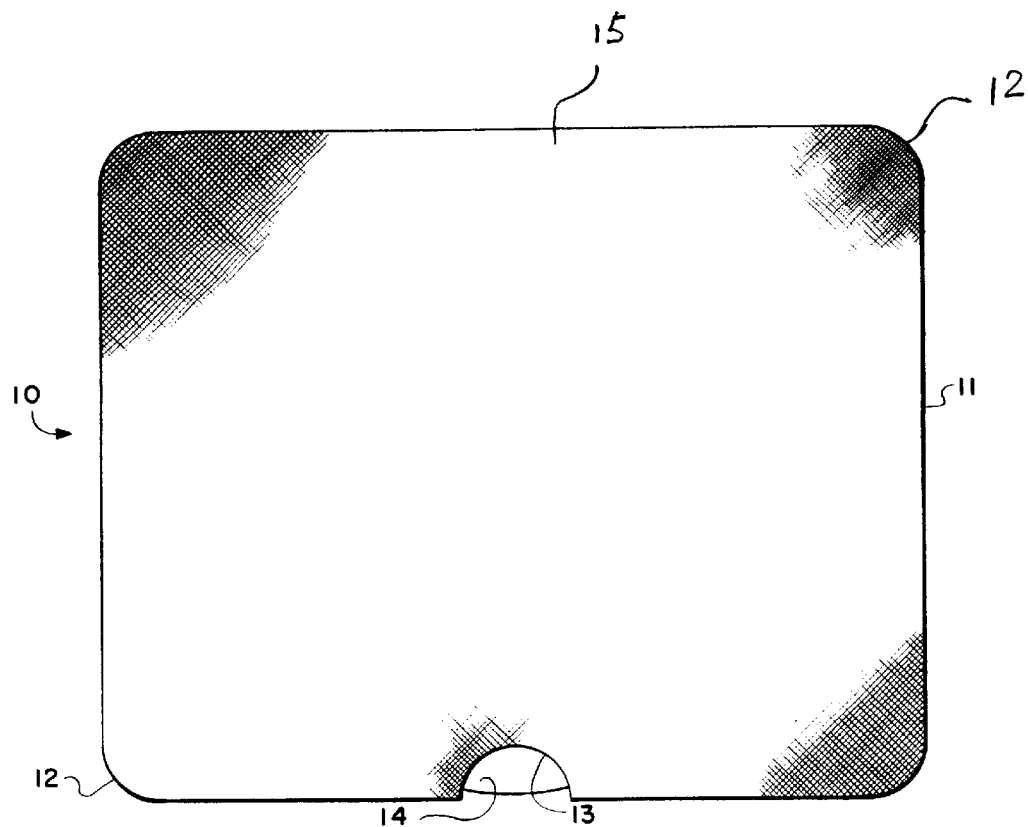
FIG. 1 is a top view of a preferred embodiment of the claimed mouse pad.

FIG. 1 displays a top view of a mouse pad 10. The periphery 11 of the pad 10 is generally rectangular in shape having rounded corners 12. There is also shown a notch 13 which allows a person to easily grasp a computer disk 14 that may be stored within the pad. The top surface 15 of the pad 10 is smooth and flat. In a preferred embodiment, the top surface 15 is made of a stiff vinyl material that provides a reliable surface for a mouse to effectively operate on. If the top surface 15 is not substantially flat, then a mouse (not shown) cannot be reliably rolled over the pad to give uniform movement. Therefore, an uneven top surface is not effective as a mouse pad. While mouse pads are generally flexible, the top surface 15 of the pad 10 must be rigid enough to allow the mouse to operate when it is rolled over the top surface of the pad.

Figure 2:
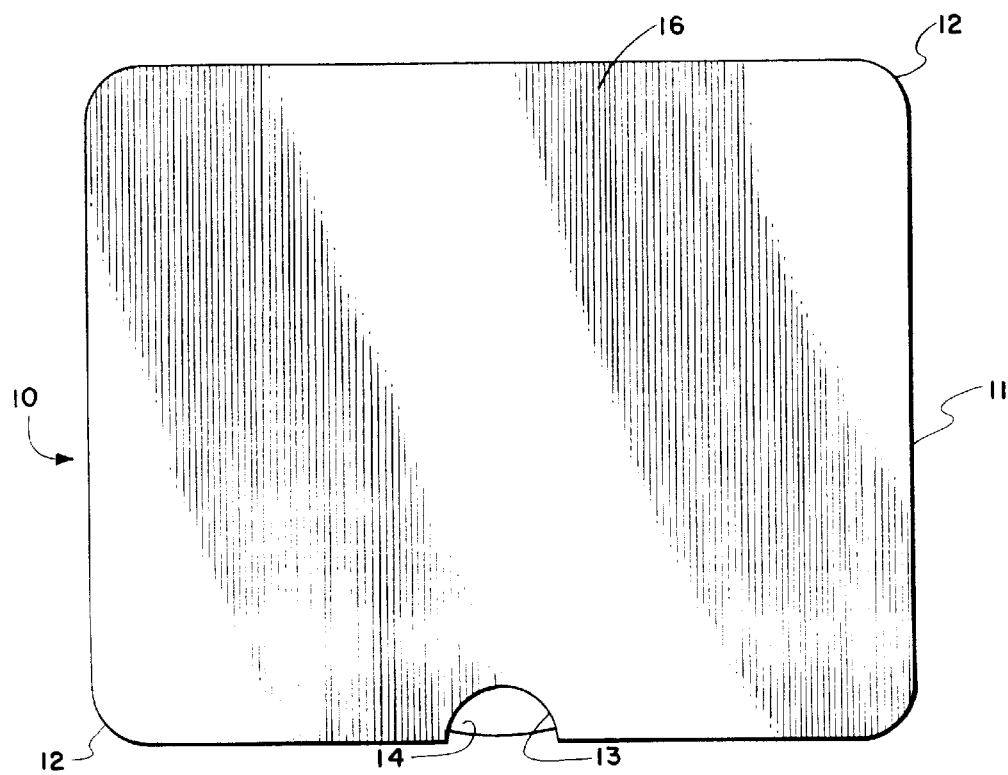
FIG. 2 is a bottom view of a preferred embodiment of the claimed mouse pad.

FIG. 2 displays the bottom surface 16 of the mouse pad. The notch 13 and rounded corners 12 are shown on the periphery 11 in this bottom view of the pad 10 similar to the top view in FIG. 1. The bottom surface 16 of the pad is made of a rubber non-skid material. Other non-skid materials may be used as well. The non-skid feature of the bottom surface 16 prevents the mouse pad 10 from sliding about in an unwanted manner as the mouse is rolled around on the top surface 15 of the pad.

Figure 3:
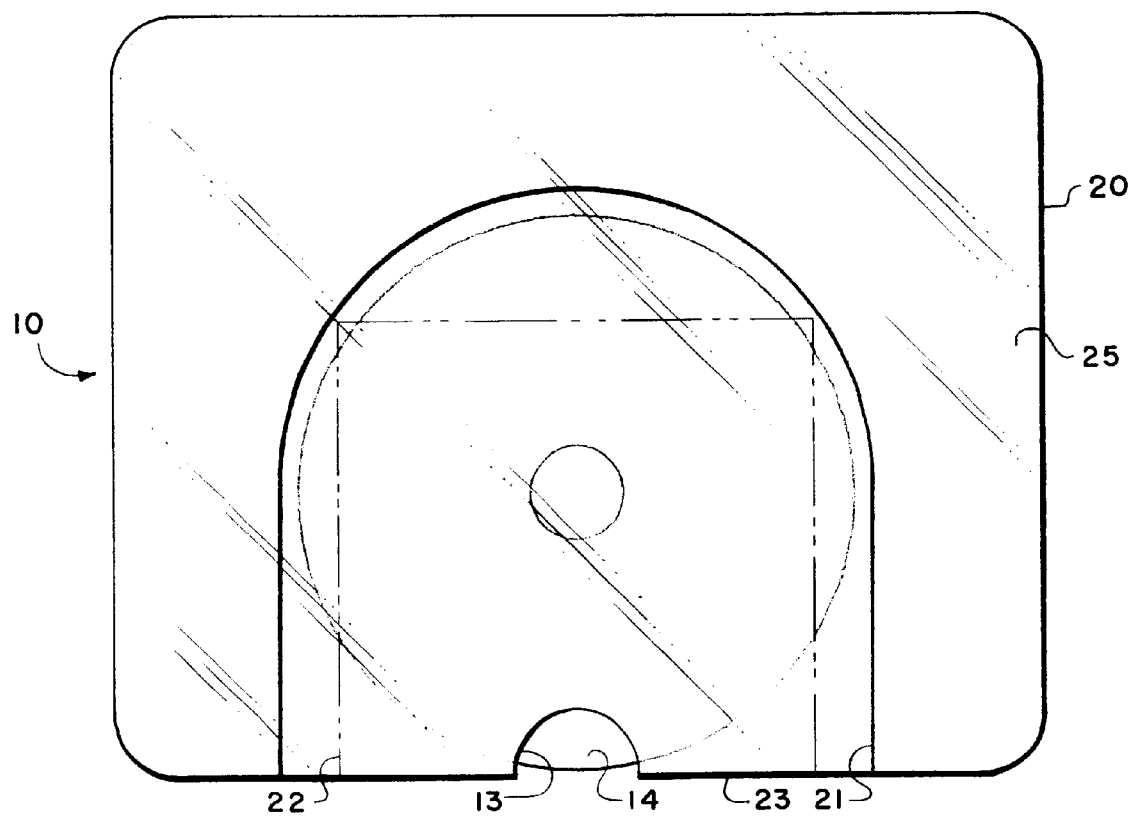
FIG. 3 is a top view of the mouse pad in FIG. 1 wherein the top layer of the mouse pad is transparent.

FIG. 3 displays a top view of the mouse pad 10 wherein the top layer 25 is a transparent material. The body 20 of the pad 10 defines a U-shaped aperture 21. The body 20 is that portion of the pad 10 which is beneath the transparent top layer 25. The aperture 21 has an end wall which is arcuate and parallel side walls with the space between the parallel walls being sufficient to accommodate a common computer disk 14 known as a cd. There is also shown in dotted lines 22 a rectangular space where a different type of computer disk, for instance a 3 ½" disk is also shown to be able to fit within the aperture 21. The aperture is open all the way to the side edge 23 of the pad 10. When a computer disk 14 is placed within the aperture 21 in the pad 10, it protrudes into the notch 13 where it is easily grasped by a user because the distance between the bottom of the notch and the arcuate end wall of the aperture is less than the diameter of the disk. The specific shape of the aperture 21 is preselected based on the specific type of computer disk that is intended to be stored within the pad. In any case, the portion of the aperture 21 open to the side edge 23 of the pad 10 is at least as wide as the widest diameter of the computer disk selected to be stored within the pad 10.

Figure 4A:
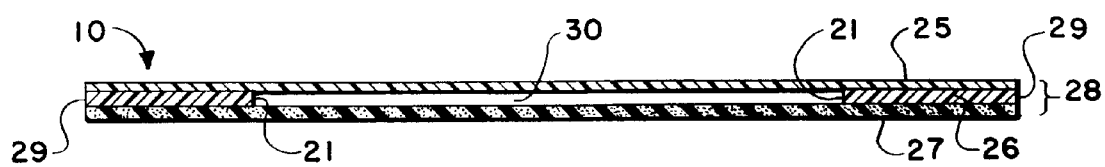
FIGS. 4a and 4b are side, cross-sectional views of alternative embodiments of the claimed invention.
Figure 4B:
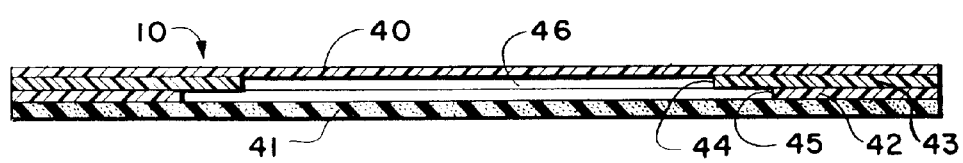

FIGS. 4a and 4b are side cross-sectional views of alternative embodiments of the mouse pad 10 described herein wherein the pad 10 is fabricated as a lamination.

FIG. 4a displays a three-layer mouse pad. The top layer 25 has a smooth, flat vinyl surface. The bottom layer 27 has a rubber, non-skid bottom surface. The middle layer 26 is made of plastic material and makes up the body 20 of the pad 10. The thickness 28 of the side edge 29 of the pad 10 is the total thickness of the top 25, middle 26 and bottom 27 layers. The thickness 28 is selected to be greater than the thickness of a computer disk 10 that may be stored within the pad 10. The side edge 29 is defined by the periphery of the pad 10. As shown, the side edge 29 is perpendicular to the top and bottom surfaces of the pad. There is a pocket 30 shown in FIG. 4a which is formed by the aperture 21 in the middle layer 26 that is sandwiched between the top 25 and bottom 27 layers of the pad. The specific dimensions of the pocket are selected based on the dimensions of the specific type of computer disk to be stored. The top, middle and bottom layers are laminated together with an adhesive that will be known to one of skill in the art.

FIG. 4b displays a four-layer mouse pad having a top 40 with a flat and smooth vinyl surface and a bottom 41 with a rubber non-skid surface. The two middle layers 42, 43 have defined apertures 44, 45 of different size and make up the body 20 of the pad 10. Therefore, the pocket 46 that is seen in this side cross-sectional view has two different diameters and/or sets of dimensions. In this way, more than one type of computer disk may be stored within the mouse pad. The preselected thickness of each of the middle layers 42, 43 will depend upon the thickness of the computer disks intended to be stored within the mouse pad 10. The thicknesses of the middle layers are chosen to be the same as the thickness of the computer disks 14 to be stored. In this way, when the computer disks 14 are placed within the mouse pad 10, the top surface of the mouse pad is still substantially flat and smooth and allows for free movement of the mouse across the top of the pad.

The top layer 25 of the mouse pad 10 may be made of a transparent material. In this way, the computer disk 14 is visible through the top layer 25 of the mouse pad 10 when the disk is in the pocket inside the mouse pad. This can be used as an effective marketing tool where the design or indicia on the computer disk may blend in or compliment the design printed upon the mouse pad.

The mouse pad 10 illustrated in FIGS. 1–4 is made of a combination of plastic and/or rubber material where the pocket 21 is formed in the body of the pad. Additional materials that could comprise the different layers of the pad and/or the entire pad include injected plastic, foam products, wood or metal materials. The pad 10 may be a single unitary piece or it may comprise a plurality of pieces or layers.

The illustrated embodiments disclose a single pocket 30 or a pocket having space for multiple disks 14 layered on top of each other. Alternative embodiments include mouse pads having dimensions large enough to contain two or more different and separate pockets for the storage of a plurality of computer disks. A further embodiment includes a pad that also serves as a surface beneath a keyboard. In this way, a plurality of computer disks could be readily available to a user of a computer.

While the invention has been described with particular reference to specific embodiments, in the interest of complete definiteness, it will be understood that it may be embodied in a variety of forms diverse from those specifically shown and described, without departing from the spirit and scope of the invention as defined by the appended claims. It is intended that all such embodiments shall fall within the scope of protection provided by the claims attached hereto.

That which is claimed is:

1. A pad adapted to support a computer mouse and adapted to store a computer disk of a predetermined thickness, the pad comprising:

a substantially flat top surface;

a continuous and flat bottom surface;

a side edge about the periphery of the pad between the top and bottom surfaces, the side edge having a thickness greater than the thickness of the computer disk; and an empty pocket in the pad defining an aperture of a shape adapted to receive a computer disk, the pocket having an opening through a portion of the side edge and a height adapted to substantially equal the thickness of the computer disk, wherein the pocket is adapted to receive the computer disk therein; wherein the computer disk has an arcuate edge and the pocket has an arcuate inner wall complementing the arcuate edge of the computer disk.

2. In combination, a pad and a computer disk the pad having a continuously flat surface for supporting a computer mouse and the computer disk having a selected diameter and thickness wherein the pad includes an aperture for receiving the computer disk therewithin the aperture having a height substantially equal to the thickness of the computer disk; wherein the pad includes a transparent portion aligned with the aperture making the disk visible through the surface supporting the mouse.

3. The combination of claim 1 wherein the pad includes an edge opening aligned with the aperture, the edge opening having a length at least as large as the diameter of the computer disk.

4. The combination of claim 3 wherein the pad is an integral structure in the form of a lamination.

5. A pad for supporting a computer mouse and for storing at least one computer disk of a selected diameter comprising:

a substantially flat top layer adapted to support a computer mouse;

a continuous and flat bottom layer adapted to engage a support surface;

a middle layer forming a lamination with the top and bottom layers, the middle layer defining an empty aperture of a shape adapted to receive a computer disk therein, the aperture having a height adapted to substantially equal the thickness of the computer disk and being open to a side of the middle layer;

wherein the top, middle and bottom layers are laminated together leaving a pocket in the pad defined by the top and bottom layers and the aperture.

6. The combination of claim 5 wherein the pad includes an edge opening aligned with the aperture, the edge opening having a length at least as long as the diameter of the computer disk.

* * * * *